Figure 1:
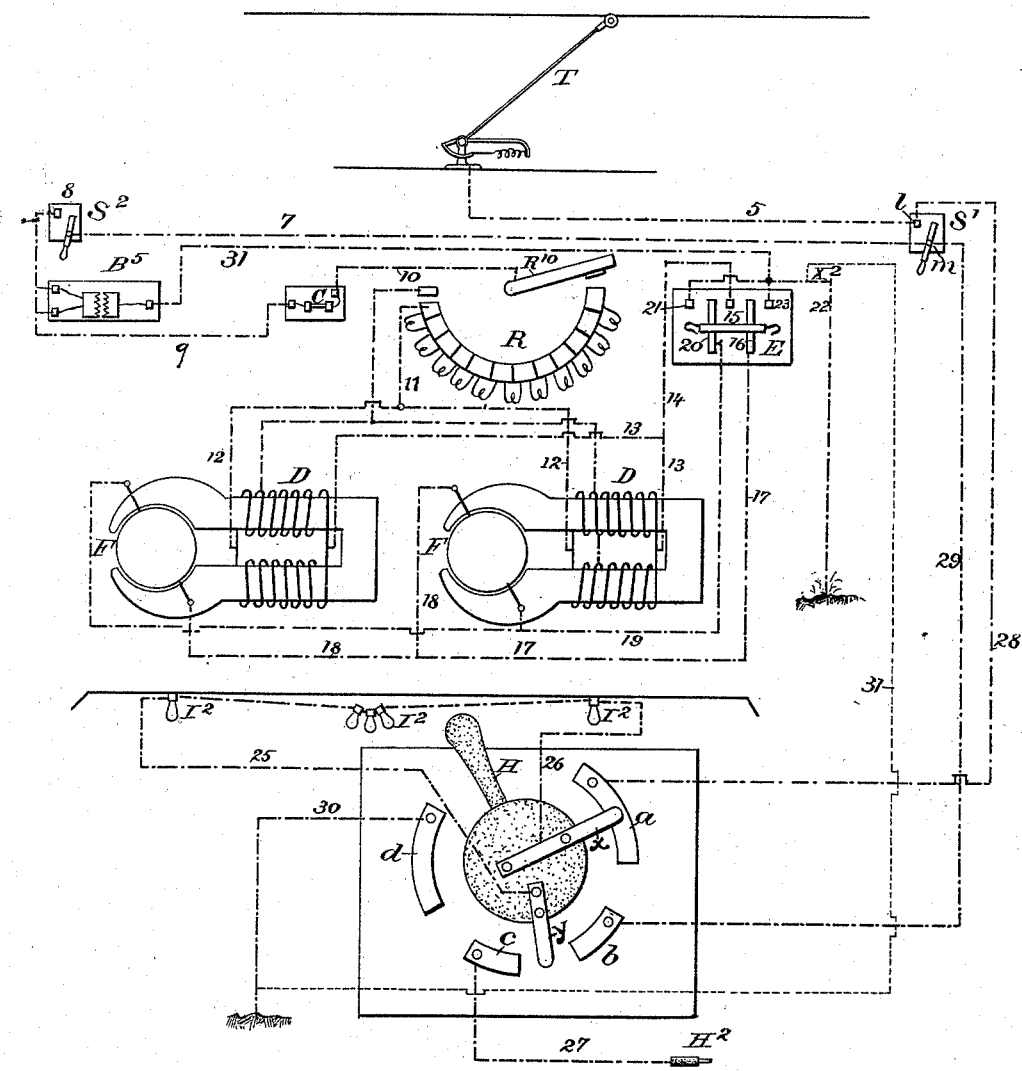

(No Model.) 3 Sheets—Sheet 1.
T. STEBBINS.
TESTING INDICATOR FOR ELECTRIC RAILWAY CARS.
No. 526,644. Patented Sept. 25, 1894.

ATTEST:
J. Murdle
T. F. Corey

INVENTOR:
Theo. Stebbins

By H. E. Townsend
Attorney (No Model.)
3 Sheets—Sheet 2.

T. STEBBINS.
TESTING INDICATOR FOR ELECTRIC RAILWAY CARS.

No. 526,644. Patented Sept. 25, 1894.

ATTEST:

INVENTOR:
Theo. Stebbins

By H. C. Townsend
Attorney (No Model.)

3 Sheets—Sheet 3.

T. STEBBINS.
TESTING INDICATOR FOR ELECTRIC RAILWAY CARS.

No. 526,644. Patented Sept. 25, 1894.

ATTEST:
J. H. Hurdle
W. H. Capel.

INVENTOR:
Theo Stebbins

By H. C. Townsend
Attorney

UNITED STATES PATENT OFFICE.

THEODORE STEBBINS, OF BOSTON, MASSACHUSETTS.

TESTING-INDICATOR FOR ELECTRIC-RAILWAY CARS.

SPECIFICATION forming part of Letters Patent No. 526,644, dated September 25, 1894.

Application filed August 21, 1890. Serial No. 362,595. (No model.)

*To all whom it may concern:*

Be it known that I, THEODORE STEBBINS, a citizen of the United States, and a resident of Boston, in the county of Suffolk and State of Massachusetts, have invented certain new and useful Testing-Indicators for Electric-Railway Cars, of which the following is a specification.

The object of my invention is to provide a convenient, rapid, and safe means of testing electric circuits and apparatus, particularly on electric cars where the apparatus and wires are liable, on account of the nature of the service, to become disarranged.

My invention consists of what I term a testing indicator comprising a suitable indicating instrument, such for instance as a galvanometer, incandescent lamps or other appliances to indicate the presence or amount of an electric current, in combination with electric switch appliances having connections to the circuit or parts of circuit, or to the apparatus or parts of apparatus, to be tested, to the ground and to the opposite terminals of the indicating instruments whereby, as more fully hereinafter described, said indicator may be connected with one terminal to ground and the other terminal to the circuit or apparatus, or any portion thereof, to be tested, or may be connected with one terminal to a source of current while its other terminal may be applied at pleasure to any part of the circuit or circuits or apparatus to be tested.

My invention consists further in suitable combinations of switch apparatus and connections, as hereinafter more fully described, whereby the test indicator may be applied so as to form a shunt or branch around any part of the apparatus to be tested, as, for instance, the various circuits of a propelling electric motor upon an electric railway car.

My invention consists also in certain special combinations of devices and apparatus, as hereinafter more fully described and then specified in the claims.

My invention is of special utility in connection with electric street cars, and when properly designed for the specific purpose, as hereinafter described, will enable a motor-man, or other persons not skilled in electrical science, to test the circuit and apparatus at any time without danger of injury to themselves or to the generators, motors and other parts of the circuit. Without some means of test, a car may be greatly delayed while the men are trying to locate a difficulty. Sometimes an entire line is tied up by a ground on one car which short circuits the line, and if anything happens to a car at night time, the motor-man cannot well see what has happened and has no safe means of finding out unless some provision, such as that provided by my invention, is made therefor.

The design of such indicator and the connections from it to the electric apparatus will depend upon the kind of electric apparatus used, the connections or combinations of connections used between the parts of such electric apparatus, and the precise purpose which it is desired to accomplish by the use of such an indicator. If the electric apparatus fails to perform its functions, then to discover the fault it is necessary to know if the motive power is still active and if the circuit is properly completed, or if not, the location of the short circuit or open circuit or ground. The testing indicator may accomplish all or a portion of these purposes, depending upon its design and its connections with the electric apparatus and, in some cases, on the connections or combinations of connections between the parts of the electric apparatus. Different testing indicators may be used to accomplish some or all of these purposes. For instance, one particular design of testing indicator might accomplish all the desired purposes, except the more delicate tests. The reason may be that the indicating apparatus of the testing indicator does not have the required range or the switch of the indicator may not have suitable contacts, and so a second testing indicator may be used for the special purpose. For example, one testing indicator may be suitable to test for electrical connections between different parts of the electric apparatus and another for short circuits within any part, such as in the armature or field coils of the motor. The indicating apparatus and the connections, either or both, may be different in the two testing indicators.

By suitable adaptation, this testing indicator can be used in connection with any method of conducting the current from the generating plant to the cars, either single or double overhead, single or double conduit, or with storage battery cars, and on all electric cars no matter what may be the method of controlling the speed.

My testing indicator may be used in an electric power station in connection with any system of wires to readily and safely ascertain whether any individual wire is connected to the source of current supply or is grounded; or it may be placed in an electric box containing switches and fuses to which are suitably connected the trolley wires, mains and feeders of an electric railway system, and be used to show whether the individual electric wires entering this box are insulated from the source of electric supply and the ground.

In the accompanying drawings, I have illustrated diagrammatically, various arrangements of circuits and apparatus embodying my invention.

Figure 2:
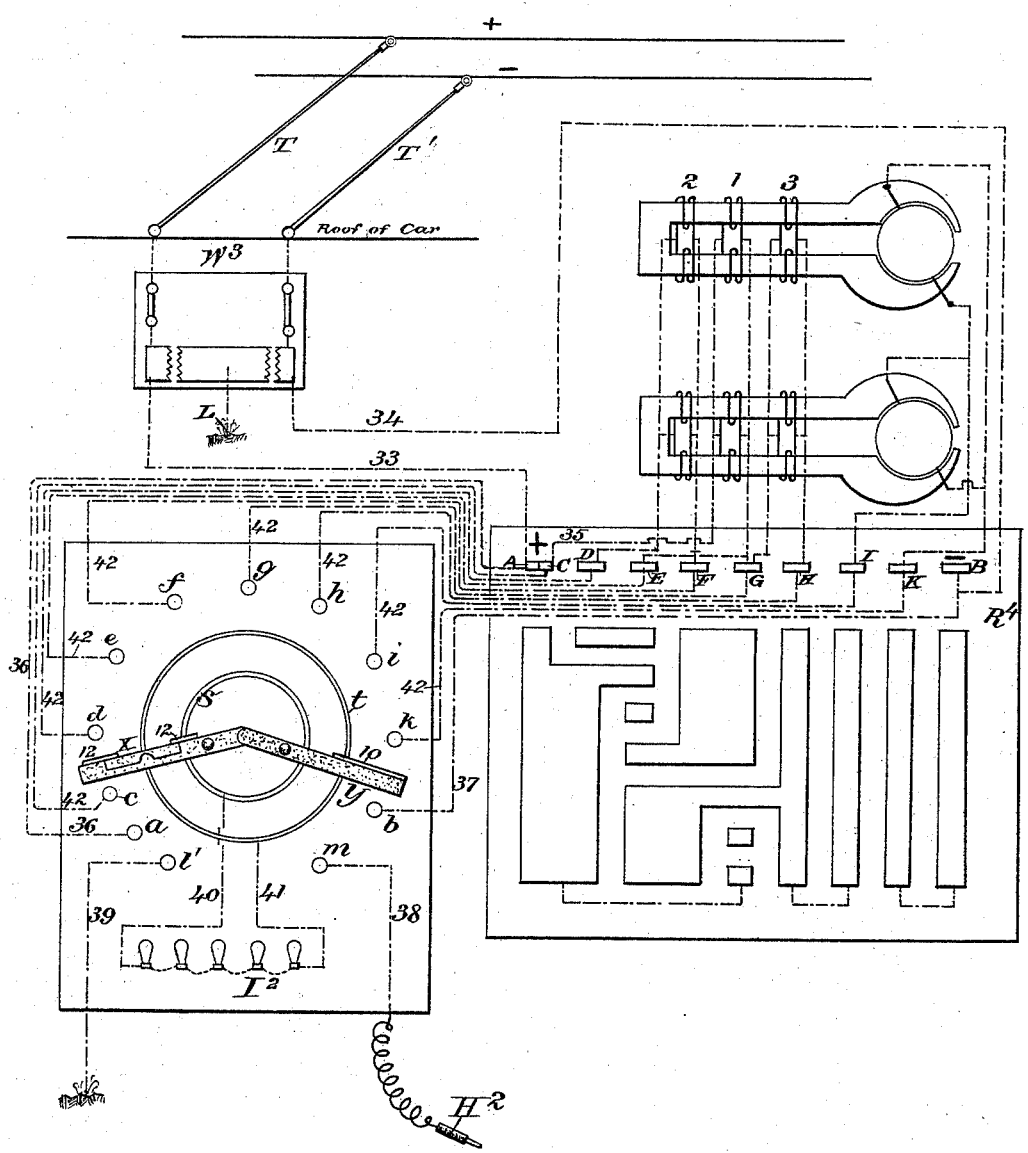
Figure 3:
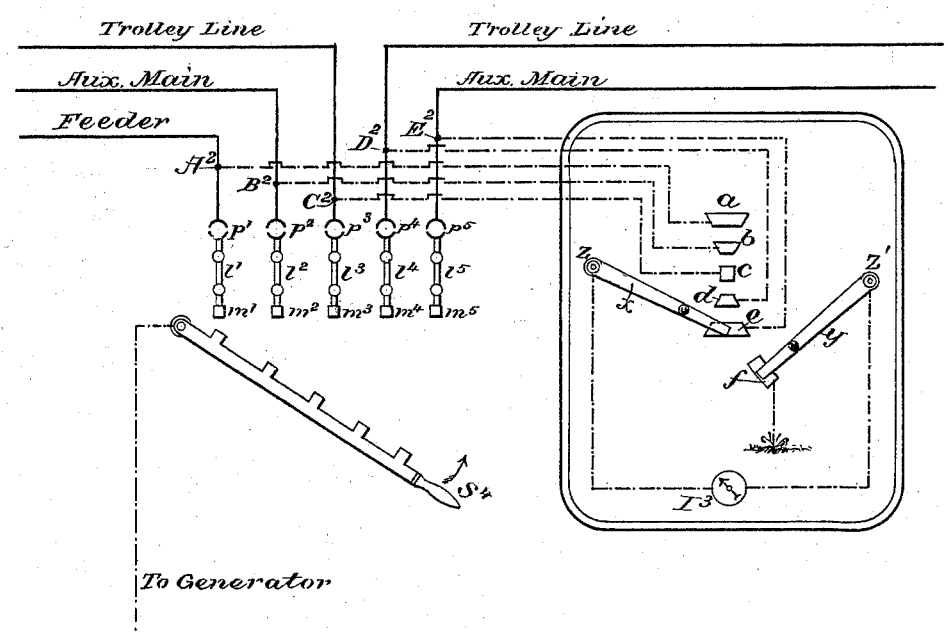

Figure 1, is a diagrammatic view of my invention applied to a system of electric locomotion wherein the current is supplied through an overhead wire (or it may be in a conduit) and returns to the source of power through the rails, ground wire (if there be one) and the ground. Fig. 2, is a diagrammatic view showing my invention as applied to a case where the current is fed and returns through two overhead wires, (both insulated from the ground) or both wires may be placed in a conduit. Fig. 3, is a diagrammatic view of another application of my invention wherein the electric current is fed to separate sections of trolley wire through auxiliary mains and feeders.

Having now particular reference to Fig. 1; this drawing shows the apparatus ordinarily installed on an electric car to control and protect the motors which propel the car. When the switches S', S², are closed the current normally passes from the overhead line W, successively through the trolley T, wire 5, contact $l$, of main switch S', switch lever S', pivot $m$, wire 7, main switch S², contact 8, of said switch, lightning arrester B⁵, wire 9, fuse box C, fuse therein, wire 10, rheostat lever R¹⁰, rheostat R, wire 11, wires 12, branching to field magnet coils D, wires 13, joined to wires 14, reversing switch E, by contact 15, lever 16, when switch is in one position, wire 17, branches 18, to armatures F, back to reversing switch by wire 19, lever 20, contact 21, and to ground or return by wire 22. When switch is in other position circuit is from 14, to 15, lever 20, wire 19, armatures in opposite direction, wire 17, lever 16, contact 23, and to wire 22, and return. The ground plate of the lightning arrester connects to earth by wire 31, and 22. The apparatus and devices named in detail and the circuits by which they are connected, together, form no particular part of my invention being of the ordinary construction and are arranged and constructed the same as on any electric car.

S', S², are the ordinary electric switches placed at opposite ends of the car and designed to open the circuit from the trolley through the motor and the controlling apparatus. The switches, either or both of them, may be used also as a means for introducing the indicator, or a portion of the circuit of the switch devices used therewith, into the circuit leading to the motor in which case certain connections are made from the switch used with the indicating instrument to the terminal of the switch S', S². Such an arrangement is employed where the design is to have my test indicator permanently established in position upon the car ready for use at any time; an arrangement of the organization which it is generally preferable to employ.

The test devices used with the testing indicator is here shown as a number of incandescent lamps I², which are preferably the lamps employed for lighting the car. I have in this illustration of my invention shown the switch appliances connected immediately with the indicating instruments as organized with two of their movable terminals connected to the terminals of the indicating instrument while certain fixed contact terminals are joined to the ground and to the circuit to be tested, although, as will be well understood by electricians conversant with the construction of electric switch apparatus, the arrangement might be readily reversed and the fixed terminals and movable terminals transposed, the terminals of the indicating instrument being connected to fixed contacts instead of to movable ones.

H, is the handle of the switch apparatus, and $x$, $y$, two contact arms of the switch, in the present instance shown as fixed with relation to one another (although as will be hereinafter indicated the terminals might be movable with relation to one another) and mounted upon an insulating cylinder or support which may be turned by the handle H, so as to bring the contacts $x$, $y$, into connection with certain fixed switch terminals $a$, $b$, $c$, $d$. These contacts connect by wires 25, 26, with the test lamps I².

An additional movable contact terminal which is employed in some parts of the testing, is represented by the testing plug or contact H², consisting of a metallic tip flexibly connected by wire or connection 27, to a fixed contact $c$, whereby the terminal of the testing indicator resting on such contact may be brought into connection with any part to be tested. As will be obvious to electricians, a movable contact terminal having the functions of H², might be provided by other mechanical constructions adapting the block $c$, to be placed in electrical union with other conductors. The tip H², is preferably provided with an insulated handle to facilitate its use without placing the body of the operator in connection with the apparatus tested.

Terminal $d$, connects by wire 30, with ground. Terminals $a, b$, connect by wires 28, 29, with switch contact $l$, and pivot $m$, of switch S'.

The connections to points $l, m$, being permanent ones, it is obvious that the indicator may be thrown into or out of connection by the operation of the switch S', at pleasure, said switch operating when closed to shunt the indicator. Though I have shown the terminal $d$, as connected to ground by an independent connection, it is obvious in practice that such connection would be made by attachment to the motor circuit as, for instance, at the point $x^2$, on wire 22, as indicated by the dotted line 31.

The contact pieces $a, b, c, d$, are proportioned and spaced so that the arms $x, y$, in their rotation respectively make contact with contact pieces $a$ and $b$, $a$ and $c$, $b$ and $d$, $c$, and $d$, which I will call positions 1, 2, 3, 4, respectively.

Having shown one arrangement of switching appliances and connections constituting one form of my testing indicator and the connections to the car circuit, I will explain some of the tests which may be made. Turn the arms $x, y$, into contact respectively with contacts $a, b$, or in first position, and open main switch S'. Turn on rheostat arm $R^{10}$, to make connection with rheostat plate connected to 11, and leave reversing switch in mid-position to open normal ground circuit and disconnect armatures. The test instrument will now be connected with its one terminal to line and with its other to the motor circuit, the connection being arm T, wire 5, contact $l$, wire 28, terminal $a$, arm $x$, wire 26, lamps $I^2$, wire 25, arm $y$, terminal $b$, wire 29, pivot $m$, wire 7, switch lever of $S^2$, contact 8, lightning arrester, wire 9, fuse, wire 10, arm $R^{10}$, rheostat, wire 11 and to motor. If the indicating lamps burn, it shows that a ground or leak exists on some portion of the circuit exclusive of the armatures and their connections, which are now disconnected at both terminals from other portions of the circuits at the reversing switch. This ground or leak may be traced and located either in a field spool, the connecting wires thereto, the rheostat, lightning-arrester, fuse box, a main switch, by disconnecting respectively these portions of the circuit. Of course a ground and a leak differ only in degree, not in kind. If the indicating device consists of an electric measuring instrument, as a galvanometer, the amount of leak can be accurately measured. But, with a little experience, a series of incandescent lamps will answer as well for practical purposes, by observing the brilliancy of the lamps, or, if they are not visibly incandesced, by observing the spark at breaking circuit; one can estimate a leak as slight as about five hundredths of an ampère. The testing indicator, in the first position, may serve a further purpose in case of the occurrence of the following conditions. On any car the apparatus may become short circuited, notably in the lightning arrester (a piece of apparatus in which two points necessarily at full difference of potential are brought in close proximity and may become fused together). In this case it is the practice to temporarily cut off the current from the whole line at the central station either automatically or by hand. The men in charge of the car on which the fault has actually occurred may not be aware that their apparatus on their car has short-circuited and is preventing the normal supply of current to the whole line. To remedy such condition of affairs the motor men can be instructed so that in observing that the current is cut off from the line at any time, each man will open main switch S', and put the testing indicator in position 1, and close circuit at rheostat and reversing switch E. On current being fed to line again it will be observed by the indicating devices and all the cars, except the one at fault may proceed immediately, because by the interposition of the resistance of the indicating appliances on the car at fault the shunting of the current from the other cars by the short circuit in such defective car is stopped. In such other cars, however, the motor man may be instructed to immediately test by opening the reversing switch, in which case, if the test lamps go out, the indication is that there is no fault such as a ground in either arrester, fields or rheostat, and on closing the switch S', the car will proceed in the usual manner. On the car at fault the motor man can proceed to make the proper test. At the present time, in case of the above condition of affairs, there is no methodical way of ascertaining the source of trouble.

Turn the handle H, of testing indicator into second position, or so that $x, y$, make contact respectively with $a, c$; one terminal of the indicating device $I^2$, is thereby connected to the overhead line, as a source of current, by wire 26, $x$, wire 28, contact $l$, wire 5, trolley T, and the other to the testing plug $H^2$, by 25, arm $y$, terminal $c$, wire 27. The latter may then be used to place such terminal in connection with any part of the apparatus, or of the car, by touching such parts with the metallic end $H^2$, to determine if said part is grounded. If it is, the lamps light. By placing the reversing switch E, in mid-position, the armatures F, and connecting wires 17, 19, &c., should be insulated or disconnected, and by touching the commutators with the testing plug it can be ascertained if they are actually so insulated. If they are not or are grounded the lights will so show. If it is desired to ascertain the insulation of any portion of the car for any special reason, the insulation of said portion can be readily determined with the testing plug. The testing plug may be used without any danger of short circuiting the line or the apparatus, because the lamps of the indicating device offer adequate resistance for the protection of the electric system.

It is quite obvious that in the second position of the apparatus, the same electrical test would be afforded as that provided for when the apparatus is in the first position, because the terminal of the test apparatus connected to $y$, may, by the movable terminal of test plug H², be connected to the same point to which the terminal $b$, is permanently connected, by bringing said terminal into contact with wire 29, pivot $m$, or other parts connected to $b$. The first position of the apparatus has, however, a stable position, and the construction of the apparatus with reference to the use of the devices in the manner described in connection with such first position is ordinarily to be preferred in installing the apparatus.

Turn the handle of the testing indicator to the fourth position, or so that arms $x$, $y$, make contact respectively with contacts $c$, $d$. One terminal of the indicating device is thereby connected with the ground by wire 25, arm $y$, plate $d$, wire 30 or 31, and the other to the testing plug by wire 26, arm $x$, plate $c$, and wire 27. The test plug now becomes a movable switch terminal by which the terminal of the indicating device connected therewith may be placed in electrical connection with any parts of the circuits or apparatus to be tested, and by this means it can be determined if any portion either of the apparatus or of the car is alive to the current taken up by the trolley T, when it ought not to be, or vice versa.

Sometimes there is a leakage to some bolthead, screw, or other exposed portion of the car and there exists the danger of giving more or less severe shocks to passengers. This is not such an infrequent occurence. The testing plug can be used to ascertain such a leak, though it be very slight. If there is a break in the circuit at some unknown point, by tracing along and touching successive portions of the circuit, the position of the break can be quickly determined.

The third position of the switch handle H, or the one which places the arms $x$, $y$, into contact with plates $b$, $d$, respectively, provides simply a means whereby the electric lamps may be placed in a branch to the motor so as to be fed in multiple arc therewith from the line in the ordinary way. The connection is: trolley T, wire 5, contact $l$, switch lever S', pivot $m$, wire 29, plate $b$, arm $x$, wire 26, lamps I², wire 25, arm $y$, plate $d$, and wire 30. By this disposition of the switch in connection with the indicating lamps, such lamps may be employed both for lighting and for testing purposes, the ordinary position of the switch arm H, being such as to keep the arms $x$, $y$, in contact with $b$, $d$. By this arrangement the use of the ordinary single pole lighting switch, now used, may be dispensed with. When the lamps are to be used as the testing device, the handle H, is turned so as to break the connection by way of $b$, and $d$, through the lamps to earth.

It will be obvious that in the construction of the switch indicated, the contacts $a$, $b$, $c$, $d$, or the support carrying the same might be made movable, and the other part or that carrying the arms $x$, $y$, made fixed.

Fig. 2, illustrates a modification wherein the two arms corresponding to $x$, $y$, of Fig. 1, are movable independently of one another, and the mechanical construction of the switch is a little different, while the number of contacts thereof are multiplied for the purpose of increasing a number of individual tests which may be performed when connections are made from such contacts to the various parts of the circuits or apparatus.

Fig. 2, shows diagrammatically a double overhead line, double trolley, a combined fuse box and lightning arrester, and two motors; and my testing indicator in proper connection with the system. In this drawing the field windings are shown wound in three sections 1, 2, 3, and the speed of the car is controlled by placing these field windings in the various desired series multiple arrangements. The controlling switch whereby the various combinations of field coil and connections may be effected is indicated in the drawings, but is not particularly described because it forms no part of my present invention. It is sufficient to say that it comprises a movable block or carrier R⁴, supporting a number of contact plates on the face of it joined in special combinations and adapted to make connection with and approach several independently supported contact blocks or plates marked A, B, C, D, E, F, G, H, I, K, having connections to line and to the several parts of the field coils, commutator, &c., as indicated. I have shown also in the drawings, the trolleys, T, T', which convey the current to the car from the two overhead wires marked positive and negative; also the combined fuse box and lightning arrester typified at W³, to protect against a lightning discharge or an abnormal rise of current. These devices, as well as the switching appliances hereinafter referred to in connection with this figure, and the commutator combined as indicated, do not constitute my present invention and are herein only illustrated to show the manner in which my testing indicator would be applied in connection with such an apparatus. Trolley T, connects by one fuse to wire 33, which joins to plate A. Plate C, connects by wire 35, with one terminal of the motor circuits, so that when the plates are bridged by a movable switch contact block the side of the system represented by trolley wire T, will be connected to the pole or terminal of the motor to which 35, is joined. Trolley T', connects through the other fuse by wire 34, with B, which may be placed by the switch in connection with the other terminal or pole of the motor. In this figure I have illustrated an arrangement of switch wherein the terminals of the testing indicator instead of being connected to movable arms $x$, $y$, are connected by wires 40, 41, to fixed rings S, $t$, upon which contacts carried by the arms $x$, $y$, move. The contact making arms $x$, $y$, rotate about a common center and the arm $x$, is adapted to make electrical connection between any one of the contacts $a$, $b$, &c., to $m$, and the continuous circular contact S, and the arm $y$, is adapted to make electrical connection between any one of the contacts $a$, $b$, &c., to $m$, and the continuous circular contact $t$. Such connection is formed by means of, in the case of arm $y$, a contact spring 10, which is borne by the arm and rides upon the ring $t$, at all times and will also make connection with any of the circular series of contacts. Arm $x$, carries two contact springs or brushes 12, electrically connected and adapted to bear respectively on the continuous ring S, and upon any one of the circular rings or contacts.

The contacts $a$, $b$, $c$, &c., to $m$, are connected respectively with the plates A, B, C, &c., to K, the ground and the testing plug. Contact $a$, connects by wire 36 with plate A, and thus by wire 33, with trolley arm T, and one of the supply wires as the positive and by wire 35, with one terminal of the motor circuits when A and C, are connected. Contact $b$, connects with B, or the opposite pole of the motor and field spools the supply circuits by wire 37, leading to B. Contact $m$, connects to test plug by wire 38, and contact $l'$, to earth by wire 39. The remaining contacts connect by wires 42 with plates C, D, E, F, G, H, I, K, joined to different parts of the motor and its circuits. By placing one of the arms $x$, $y$, on the contact $m$, a terminal of the testing instrument becomes connected by wire 40 or 41, ring S or $t$, spring 12, or 10, arm $x$ or $y$, and wire 38, to the contact plug which operates as a movable switch terminal for placing the indicator in connection with any part of the apparatus as hereinafter described. By placing either arm in connection with the contact $l'$, a terminal of the testing instrument is connected by 40 or 41, S or $t$, 12 or 10, $x$ or $y$, $l'$, and wire 39, to ground. When either terminal is connected to $m$ or $l'$, the other terminal may be connected by the other arm $x$, $y$, to any one of the contacts over which the contact spring carried by said arm is adapted to travel for the purpose of placing the indicator in connection with any part of the apparatus or circuits therefor.

Having shown the organization of this form of my testing indicator and its connections to the car circuit, I will explain some of the tests which may be made with it.

To determine if the positive side of the whole system is grounded, rotate arm $x$, to contacts S, $b$, thus putting lamps in connection with negative side by 40, S, $x$, 37, B, 34, at one terminal and arm $y$, to contacts $t$, $l'$, thus connecting the other terminal to earth by 41, $t$, $y$, $l'$, 39, and the brilliancy of the lamps, if visibly incandesced or the spark on breaking circuit will be a measure of the ground on positive side. The circuit is from T', to B, 37, $b$, $x$, 12, S, 40, I$^2$, 41, $t$, 10, $y$, $l'$, 39, earth to point where system is grounded and to positive wire or side of system. Rotate arm $x$, to contacts S, $a$, and the ground on negative side can be measured in the same way, the lamps being now connected at one terminal to positive side by 40, $x$, $a$, 36, A, 33, and at the other terminal to earth by 41, $t$, 10, $y$, $l'$, 39.

The above tests serve to indicate and measure the presence of a ground on the system as a whole and can be made from any car equipped with a testing indicator. If the existence of a ground is discovered, it remains to be located either in some particular car or section of the line. This is done by a process of selection. For instance, suppose the testing indicator was connected to a particular section of line and test made for positive or negative ground before any cars were in circuit, and then as each one was successively introduced into circuit. By this procedure the fault would be located either in the line or some particular car. If a ground is found on a car, it remains to determine on what part of the car. Ground the positive or negative side of circuit if a ground does not already exist on balance of system and rotate arm $x$, to contacts S, $b$, (or S, $a$) and arm $y$, to contacts $t$, $m$, and have controller switch off, thereby normally insulating and disconnecting the parts of the motor circuit. Then successively touch each part of the circuit with the testing plug and when the grounded part is reached the current will flow from positive through intentional ground to the located round and through testing plug and cord to 10, $t$, 41, I$^2$, 40, S, 12, $b$, 37, B, and to negative side of circuit. Supposing a ground exists on balance of line and also on a car, the presence of the latter can be determined by the indicating device if the resultant ground is changed by introducing the car motors into the circuit.

Supposing a ground is found on positive side of balance of the system and a ground is suspected on the car; then rotate arm $x$, to contacts S, $b$, thus connecting one pole of indicator to negative side of system by 37, B, 34 and T', and arm $y$, to contacts $t$, $m$, thus connecting other pole to test plug. Leave controller switch off, thereby normally insulating the parts of the motor circuits and bring the terminal of the testing instrument in connection with $m$, into connection with such parts by touching them with the testing plug. If there is a ground in any part it is shown by the indicating device which then receives current from positive side of balance of system to ground thereon, to ground of part touched and grounded, through same to terminal used for test, then through lamps to negative side.

Supposing that it is suspected that there is an open circuit in some part of the motor circuits; then throw the controller switch in such a position (ordinarily the first) that the parts are all in series and rotate the arms $x$, $y$, together with one arm, one contact in advance to the other; thus bridging in succession the various portions of the motor circuit connected to contacts $a$, $d$, $e$, $f$, &c., through the wires running from A, D, E, F, &c., with the indicator. Each part if intact will shunt the current from the indicator, but if circuit is broken in any part the rotating arms will finally bridge the break and the indicator will respond and locate the trouble.

Supposing that it is suspected that some part of the car or the electric apparatus is alive to the positive current; rotate arm $x$, to contacts S, $b$, thus connecting one terminal of indicator to negative side as before explained and arm $y$, to contacts $t$, $m$, connecting other terminal to test plug. If the suspected part is touched with the testing plug the lamp will light. To test for contact to negative polarity rotate arm $x$, to S, $a$, and proceed as before.

The above described tests are the most simple ones which will be required of such a testing indicator, but it is capable of a greater variety of tests.

Fig. 3, shows an application of my testing indicator to the testing of the lines of an electric railway. $S^4$, is rotated so as to join electrically $m'$, $m^2$, $m^3$, $m^4$, $m^5$, and forms what may be called a five contact single pole switch. $l'$, $l^2$, &c., are fuses placed in the respective lines. $p'$, $p^2$, &c., are plugs placed in the respective lines for the purpose of leaving open if desired the circuits at those points. This whole arrangement may be placed in a switch block and the wires $A^2$, $B^2$, $C^2$, $D^2$, $E^2$, connected thereto as shown.

The apparatus and devices previously set forth, and the connections of the same, form no particular part of my invention, being of ordinary construction.

The contacts $a$, $b$, $c$, $d$, $e$, connect severally with the circuits $A^2$, $B^2$, $C^2$, $D^2$, $E^2$, the condition of which is to be tested. Said contacts form the fixed contacts of a switch, the movable contacts of which are indicated at $x$, $y$. The arms $x$, $y$, turn by independent centers $z$, $z'$, and the arm $y$, is in addition adapted to make connection with a contact plate $f$, connected to ground. The arms themselves connect with the terminals of the indicating device $I^3$, here shown as a galvanometer, and becoming the terminals of such indicator are adapted to make the connections hereinafter described so that the indicator may be connected either so that its one terminal will be connected to a live wire forming a source of current while its other terminal may be applied to any circuits to be tested, or a terminal of the indicator may be connected to ground and its other terminal moved into connection with the contacts $a$, $b$, &c., connected severally with the wires to be tested. The appliances used in connection with the indicator for making the several connections are of an ordinary mechanical construction of electrical switch which may be indefinitely varied but still be adapted to make the several connections desired.

My testing indicator as thus organized and applied is adapted to show if any one of the lines $A^2$, $B^2$, $C^2$, $D^2$, is alive, grounded or insulated. To apply these tests I proceed as follows: Put arm $y$, in connection with $f$, thus connecting one terminal of the indicator to ground, and move the other arm $x$, over the switch contacts, thus connecting such terminal to the several lines in succession. If any line is alive it will be shown by the indicating device. In the case of trolley lines the test would be a convenient one to show if it is connected to the source of power at some other point. Supposing line $D^2$, has been cut off from balance of circuit because a ground is suspected; place arm $y$, on contact $d$, and arm $x$, on some other line known to be alive, thus connecting the terminal of the indicator $I^3$, with a source of current. If a current is shown by the indicating device, then line $D^2$, is grounded. If there is no current then line $D^2$, is insulated. It is apparent that the same or a similarly arranged testing indicator can be used at any station for supplying current from which a net-work of wires radiate to determine if any given wire is alive, insulated or is grounded.

Various changes may be made in the arrangement and construction of my testing indicator without departing from the spirit of my invention. I do not wish, therefore, to limit myself to the exact arrangement and construction herein set forth, but What I desire to claim and secure by Letters Patent of the United States as my invention is—

1. An electric testing indicator comprising, in combination, an electric apparatus or circuits to be tested, an indicating instrument, and an electric switch or contact making appliance having connections to the ground, the indicating instrument and the circuit or apparatus, or parts of the same to be tested, for connecting a terminal of the indicator either to ground or to a source of current and the other terminal to any part of the circuit or apparatus to be tested at pleasure, as and for the purpose described.

2. An indicator for testing electric circuits or apparatus, comprising an indicating instrument, an electric switch having a series of contacts severally connected with the parts of the circuit or apparatus to be tested and with the terminals of the indicating appliance, and switch contacts or connections for placing the terminal of the indicating instrument either in connection with a suitable source or current or with the ground at pleasure.

3. The combination with an electric railway motor, of a testing instrument, and an electric switch having a series of contacts connected to the several parts of the circuit for the motor and its regulating appliances, and means whereby a terminal of the indicator may be placed in connection with either of said contacts while its other terminal is provided with means for placing it in connection either with the ground or with a source of current.

4. In an electric testing indicator, the combination of an indicating device or devices with a switch contact arm or arms forming the terminal or terminals of such device or devices, two or more electrical contacts which are adapted to be engaged by said contact arm, and a contact finger connected to one of said electrical contacts and free to connect with the circuit or circuits or parts of a circuit or circuits to be tested.

5. The combination with the motor and electric controller circuits on a railway car, of an electric indicating instrument also on the car, a rotary testing switch also on the car having connections to such indicating instrument, to earth and to the line, and a supplemental testing device connected to a contact of said switch and free to connect with various parts of the circuit to be tested, as and for the purpose described.

6. The combination, substantially as described, with the incandescent electric lamps on a railway car, of an electric switch having connections to the motor circuit whereby the said lamps may be thrown into circuit with the motor and its controlling appliances, and supplemental contacts for connecting the lamps into a circuit between the supply wire and its return independently of the motor, whereby the same lamps may be used for illumination and for testing.

7. A testing indicator, comprising in combination, an indicating instrument, a switching appliance having connections to the terminals of said indicating instrument respectively, switch contacts connected with the circuit or apparatus to be tested, and additional switch contacts connected respectively to a movable test plug and to ground, as and for the purpose described.

Signed at Boston, in the county of Suffolk and State of Massachusetts, this 8th day of August, A. D. 1890.

THEODORE STEBBINS.

Witnesses:
LLOYD BRIGGS,
H. G. BROOKE.